United States Patent
Anderson et al.

[15] 3,700,896
[45] Oct. 24, 1972

[54] CHEMILUMINESCENCE AIR POLLUTANTS MONITORING DEVICE

[72] Inventors: Howard H. Anderson, Covina; Rudolph H. Moyer, West Covina; Donald J. Sibbett, Cucamonga; David C. Sutherland, El Monte, all of Calif.

[73] Assignee: Geomet, Incorporated, Rockville, Md.

[22] Filed: Sept. 10, 1970

[21] Appl. No.: 71,057

Related U.S. Application Data

[63] Continuation-in-part of Ser. No. 63,844, Aug. 14, 1970, Pat. No. 3,659,100.

[52] U.S. Cl.............250/71 R, 23/254 E, 250/71.5 R
[51] Int. Cl.............................................G01n 21/52
[58] Field of Search..........250/71 R, 71.5 R, 83.3 IR, 250/43.5 R, 218; 128/1; 356/96, 51, 97; 23/230, 252, 254 E; 350/3

[56] References Cited

UNITED STATES PATENTS 3,271,113   9/1966   Van Pul....................250/71 R
3,574,064   4/1971   Binnings et al..........250/71 R Primary Examiner—Archie R. Borchelt
Attorney—David H. Semmes

[57] ABSTRACT

Device or apparatus for chemiluminescence air pollutants monitoring including a plurality of microreactors simultaneously active to receive ambient air and reagents, monitoring of the microreactors being accomplished sequentially by a single photomultiplier and wherein channel monitoring is controlled by a rotary shutter which moves discretely from microreactor to microreactor, the microreactors consisting of channels. A quantitative analysis of gaseous components of the atmosphere is obtained by comparison of the signals obtained from the separate channels with appropriate calibration standards and processing circuitry.

17 Claims, 7 Drawing Figures

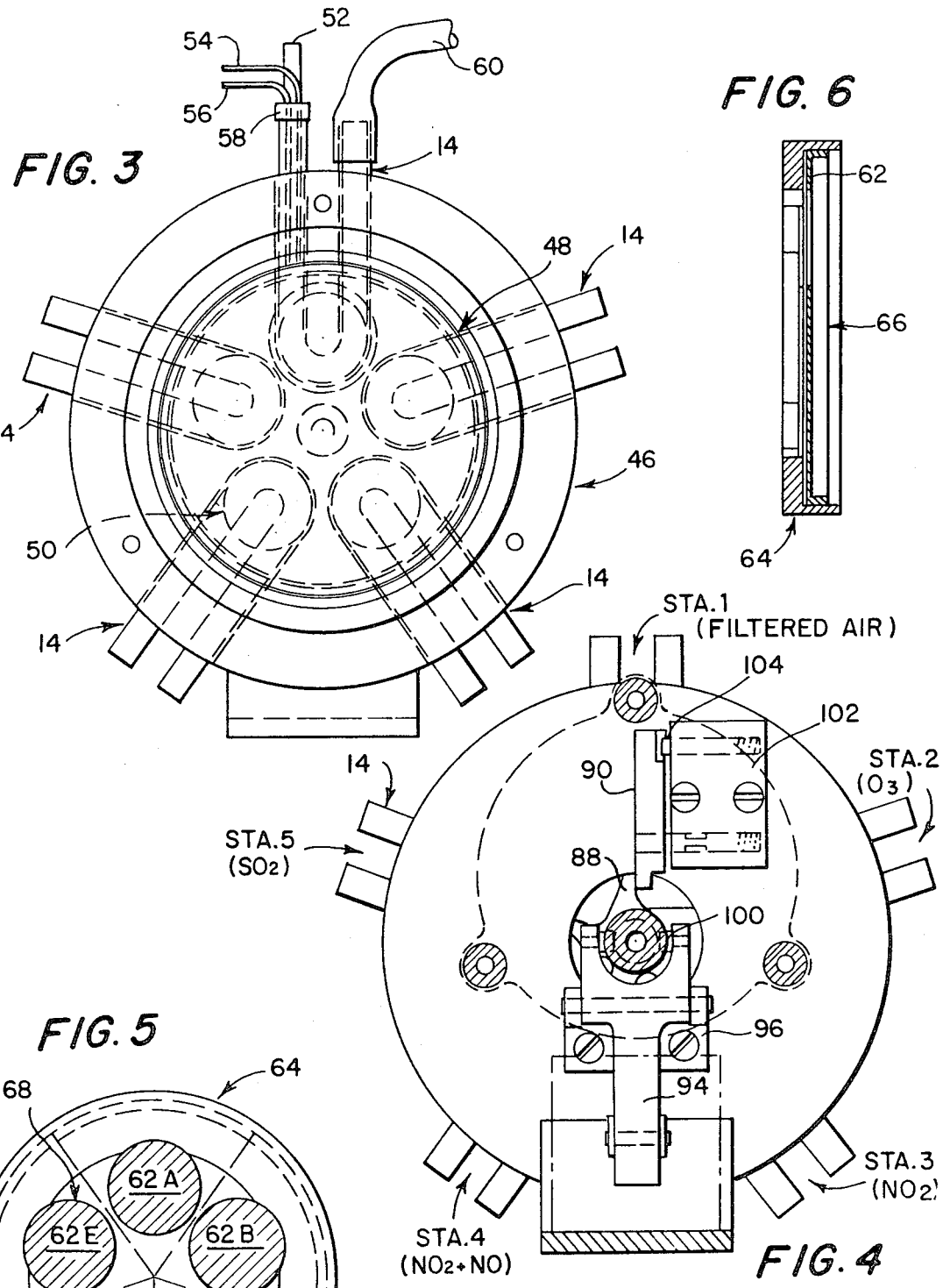

CHEMILUMINESCENCE AIR POLLUTANTS MONITORING DEVICE

CROSS-REFERENCES TO RELATED APPLICATIONS

This application is a continuation-in-part of our co-pending application entitled A SYSTEM AND METHOD OF AIR POLLUTION MONITORING UTILIZING CHEMILUMINESCENCE REACTIONS, Serial No. 63,844, filed Aug. 14, 1970, now U.S. Pat. No. 3,659,100.

SUMMARY OF THE INVENTION

The present invention is for a device or apparatus used in automatic chemiluminescence air monitoring wherein a single photomultiplier is operable as a sensor for five or six reactor cells or channels. The invention teaches a simple form of instrumentation for applying a luminol-chemiluminescence technology to solving problems associated with obtaining an analysis of pollutant gases in the ambient atmosphere. A system and method are described in our aforesaid co-pending patent application. The present invention is directed more specifically to the mechanical aspects of the test cell assembly and associated mechanisms.

The apparatus of the invention is useful in the system and method which basically consists of an air supply fed via a manifold through limiting orifices into five or six small diameter U-tube cells. At the entry to each cell, the small quantity of luminol-hydrogen peroxide solutions are added to the air stream. The heterogeneous system (air-liquid) flows through the cells to a liquid gas separator (drop-out pot) and thence to waste. The sensor signal, in terms of light output, occurs at the surface of the gas-liquid interface in the cells. The sampled air passes through the vacuum pump while the liquid may be bled off from the separator or continuously removed. The ambient air streams passing to the cells are processed in absorption columns in order to separate the gaseous components which are measured.

The multiple cell including a plurality of separate channels is usable selectively by means of a shutter mechanism for sequentially monitoring each of the channels, the rotary shutter moving discretely from channel to channel.

Additional features, advantages and objects of the invention will be more readily apparent from the following detailed description of an embodiment thereof when taken together with the accompanying drawing in which:

FIG. 3 is a sectional view taken on line 3—3 of FIG. 2;

FIG. 4 is a sectional view taken on line 4—4 of FIG. 2;

FIG. 5 is a schematic view of a filter holder and retainer for in-line use;

FIG. 6 is a sectional view of a filter retainer corresponding with FIG. 5; and

Figure 1:
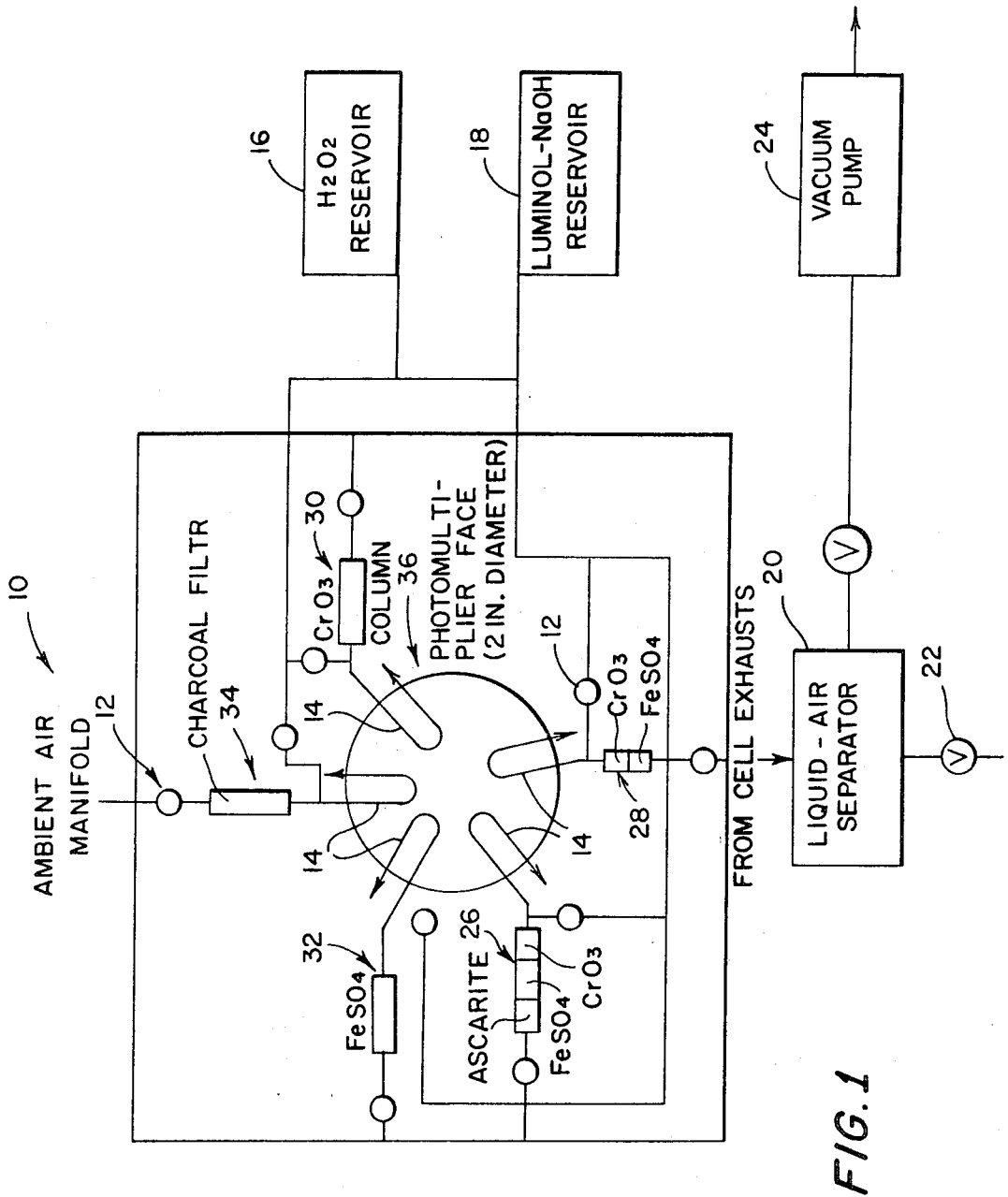
FIG. 1 is a schematic diagram of an automatic chemiluminescence air monitor in accordance with the invention indicating air and liquid flow paths.

Referring now more specifically to the drawings a concept of the broad principles of the invention is apparent from the schematic diagram of the monitor in FIG. 1 showing the various air and liquid flow paths. The air supply is fed via an ambient air manifold generally indicated at 10 through limiting orifices generally designated 12 into a plurality of, in the present instance five, preferably one quarter in. diameter (I.D.) or smaller, U-tube cells indicated at 14. At the entry to each cell, a small quantity (0.1 ml/min) of luminol-hydrogen peroxide solutions from reservoirs 16 and 18 thereof respectively are added to the air stream. The heterogeneous system (air-liquid) flows through the cells to a liquid gas separator 20 in the nature of a drop-out pot and thence to waste as indicated at 22. A desired sensor signal, in terms of light output, occurs at the surface of the gas-liquid interface in these cells. The sampled air passes through vacuum pump 24 while the liquid can be bled off from the separator or continuously removed. No pumps are required, the liquid and air being transported by the single vacuum pump 24 acting through the cells 14 and liquid-air separator 20 lines.

The ambient air streams passing to the cells are processed in adsorption columns in order to separate the gaseous components which are measured. Five adsorbent columns 26, 28, 30, 32 and 34 are used. The nature and functions of these columns are indicated as follows:

| Column | Gaseous Outputs |
|---|---|
| 26. Ascarite-Ferrous Sulfate-Chromic Oxide | Nitric Oxide as Nitrogen Dioxide |
| 28. Ferrous Sulfate-Chromic Oxide | Nitric Oxide and Nitrogen Dioxide |
| 30. Chromic Oxide | Ozone, Nitrogen Dioxide, and Nitric Oxide |
| 32. Ferrous Sulfate | Sulfur Dioxide |
| 34. Charcoal | Filtered air for background sample |

The cells 14 are arranged in conjunction with a cell assembly photomultiplier as indicated at 36 and in the shown and described embodiment set up for five channels. This cell assembly is shown in greater detail in FIGS. 3–7 inclusive. The structure includes a photomultiplier tube housing assembly 38 having a photomultiplier tube 40 mounted and contained therein with appropriate connections including a high voltage connector 42 and a signal out connector 44. Connected to housing 38 is a reaction cell housing generally designated 46 by appropriate means which mounts the various U-shaped testing cells 14 having a configuration as shown in FIG. 4. The reaction cell configurations are all similar in the apparatus. The cells are mounted through radial slots 48 leading to apertures 50 in the reaction cell housing. Interconnected into a leg of each test cell is an air in tube 52 for introduction of ambient air for testing and a luminol in tube 54 and hydrogen peroxide ($H_2O_2$) in tube 56 all of which enter through a teflon plug 58 sealing the end of the tube. The opposite end of the test cell is connected by tube 60 for exhaust. The foregoing details are apparent from FIG. 3 of the drawings. Interposed between the test cells and photo-multiplier tube assembly is a neutral density filter generally 62 consisting of five filter segments 62A, 62B, 62C, 62D and 62E supported in a filter holder 64 in conjunction with a filter retainer 66. Apertures 68 are provided in line in the filter holder and retainer to permit filter operation. Filter details are shown in FIGS. 5 and 6. A rotary shutter 70 is rotatably mounted on a shaft in bearing 72 and is provided with a shutter aperture 74 having a light sealing O-ring 76 around the shutter aperture.

Figure 2:
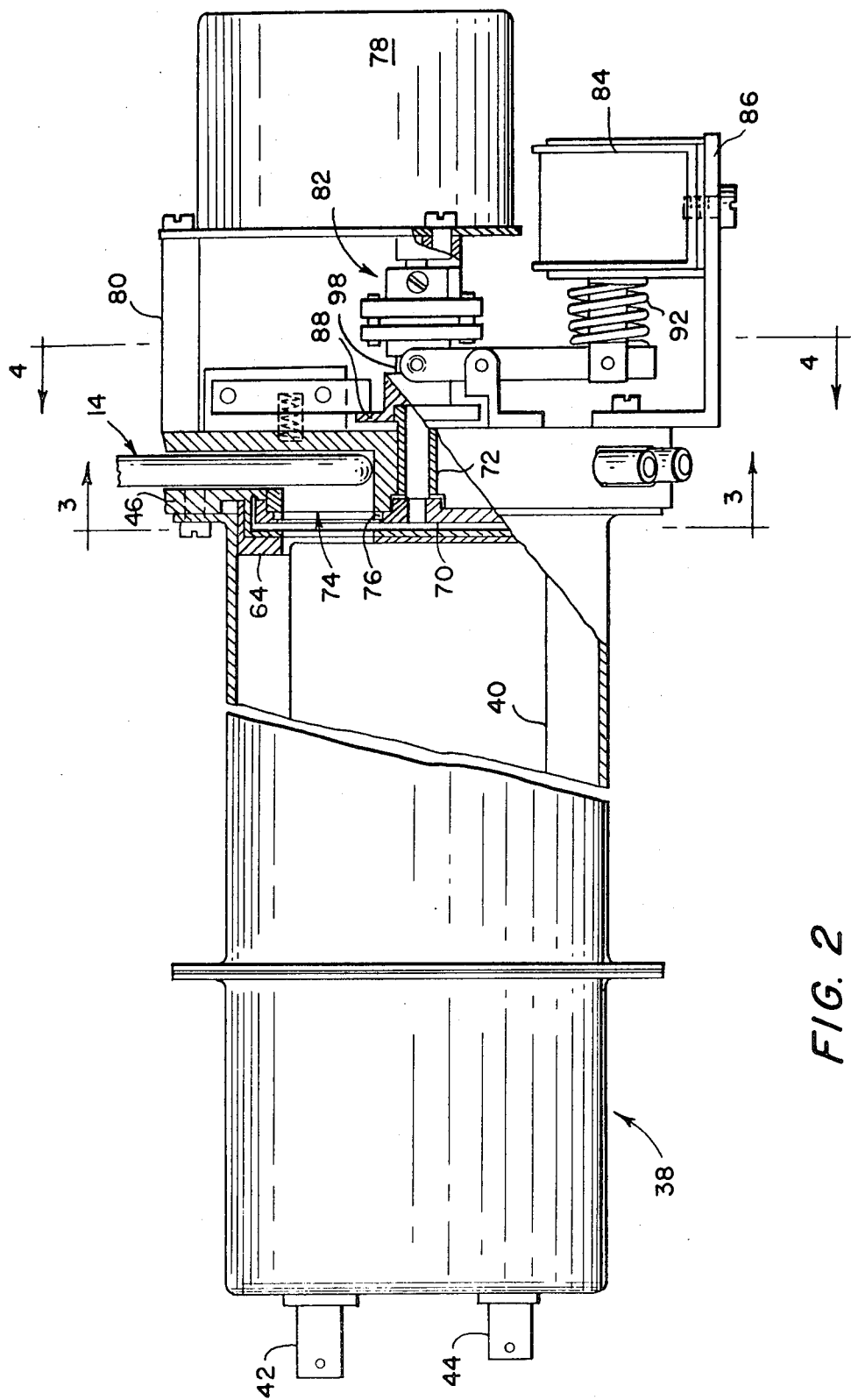
FIG. 2 is a view of the cell assembly for use in practicing the invention as set up for five test channels, a portion being broken away for clarity of detail.

A drive motor 78 is provided for the rotary shutter and which preferably can consist of a 10 rpm synchronous, 110 V. ac., 60 HZ, 1 $\phi$ is mounted by motor support posts 80 of appropriate size and number. A motor coupling generally indicated at 82 is operatively associated with the rotary shutter shaft. For the sequential phasing operational movement of the shutter for activating the various test cells a 110 V. ac. solenoid 84 is attached by means of solenoid bracket 86 to the cell housings. A five toothed ratchet wheel 88 is adapted for axial movement by solenoid 84 upon releasing index pawl 90 and relieving spring pressure of solenoid return spring 92 on shutter O-ring 76. This solenoid return spring not only applies pressure on the shutter O-ring but also resets the index pawl 90. The solenoid function is accomplished through a solenoid lever 94 pivotably mounted on lever bracket 96 and which lever is bifurcated at its free end 98 for engagement through pins 100 with ratchet wheel 88. A pawl block 102 mounts a pawl latch 104 with operatively attached pawl spring 106. Details of the foregoing mechanism are clearly shown in FIGS. 2 and 4 of the drawings.

Figure 7:
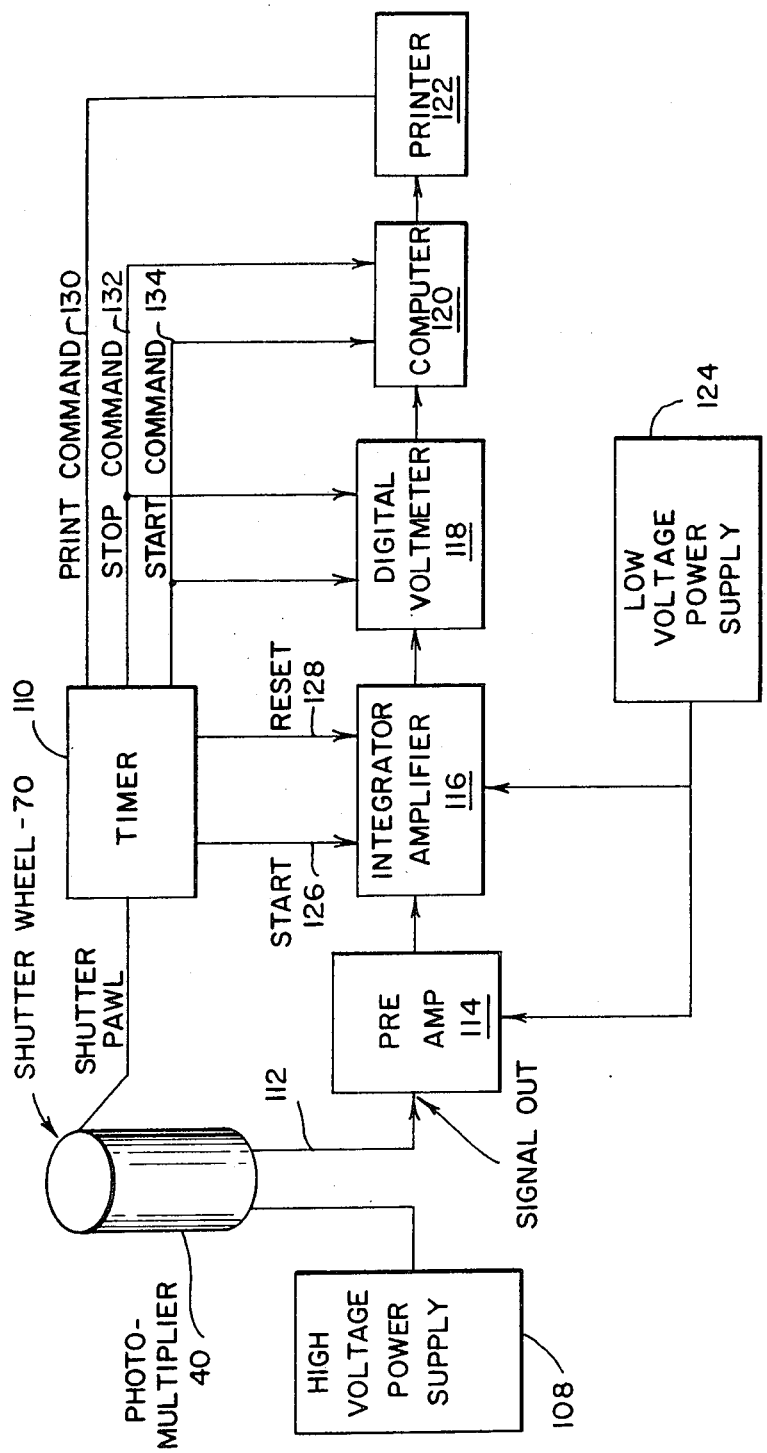
FIG. 7 is a schematic of a control and operating circuit for the invention.

The foregoing described mechanism is designed for the chemiluminescence method of monitoring air pollutants utilizing five microreactors (channels) simultaneously by means of sequential monitoring by a single photo-multiplier. The channel monitoring is controlled by the rotary shutter which moves discretely from channel to channel and a quantitative analysis of the gaseous components of the atmosphere is obtained by comparison of the signals obtained from the separate channels with calibrated standards for each channel. The signal processing may utilize a simple computer circuitry. An operating circuit is schematically depicted in FIG. 7 of the drawings. The various stations (five in number) are indicated on FIG. 4 of the drawings and include:

Station 1 — Filtered air (background reference)
Station 2 — Ozone ($O_3$)
Station 3 — Nitrogen dioxide ($NO_2O$)
Station 4 — Nitric oxide and nitrogen dioxide ($NO_2+NO$)
Station 5 — Sulfur dioxide ($SO_2$).

The foregoing are indicated in gaseous outputs.

Referring to FIG. 7 of the drawings operation of the photo-multiplier tube 40 and shutter wheel or shutter 70 are activated from a high voltage power supply 108 and a shutter pawl timer 110 respectively. Signals from the photo-multiplier pass through signal out lead 112 to a pre-amplifier 114 and thence to integrator amplifier 116, digital voltmeter 118, computer 120 to printer 122 for test result indication. A low voltage power supply 124 feeds pre-amplifier 114 and integrator amplifier 116. Timer 110 is operatively interconnected with integrator amplifier 116 through start lead 126 and reset lead 128. Timer 110 is also operatively connected with the digital voltmeter, computer and printer respectively through print command lead 130 stop command lead 132 and start command lead 134 as schematically illustrated in FIG. 7.

The following table shows the sequence of timed events for the five channel system shown and described herein. In essence, each cell will be read once every minute and the integrated signal from each will be used to calculate an analysis of each of the four gaseous constituents on the schedule, reference being made to the gaseous station details on FIG. 4.

0 Seconds — Shutter Window at Station No. 1 (Bkgrd)
+ 1 Seconds — Start Integrator
+11 Seconds — Transfer Signal to Digital Voltmeter and/or Recorder or Computer
+12 Seconds — Signal Off and Reset Integrator
+12 Seconds — Rotate Window to Station No. 2
+13 Seconds — Start Integrator
+23 Seconds — Transfer Signal to Digital Voltmeter, etc.
+24 Seconds — Rotate Window to Station No. 3
+25 Seconds — Start Integrator
+35 Seconds — Transfer Signal to Digital Voltmeter, etc.
+36 Seconds — Rotate Window to Station No. 4
+37 Seconds — Start Integrator
+47 Seconds — Transfer Signal to Digital Voltmeter, etc.
+48 Seconds — Rotate Window to Station No. 5
+49 Seconds — Start Integrator
+59 Seconds — Transfer Signal to Digital Voltmeter, etc.
+60 Seconds — Rotate Window to Station No. 1

REPEAT OPERATION

For a six channel system for example repetitions will occur every ten seconds.

Subsequent to the foregoing time sequence repeat operation is initiated.

Operation of the invention will be more readily understood from results of sensitivity tests run to determine sensitivity of the chemiluminescence reaction to the four gases: $SO_2$, $O_3$, $NO_2$, and NO.

All operations were conducted dynamically. In this operation, $SO_2$, $NO_2$, and NO were diluted in two steps: (1) gases from tank supplies were passed into a surge or test chamber of a six-inch pipe where they were mixed with purified air. (2) Various quantities (50 to 1,000 ml/min) of this supply were further diluted with filtered air in a second dilution step. Utilization of this two-step procedure made available dilutions upward from 19 ppb by volume. Gas samples from the dilutor were fed directly into the chemiluminescence reactor cell where mixing with luminol and hydrogen peroxide solutions took place. Air was passed through the sample reaction tube at flow rates from 500 ml/min to 6.7 liters/min. The liquid reagents, usually 0/25 mg/ml of luminol in 0.05 N NaOH and 0.6 percent $H_2O_2$, were fed to the cells. The cell was placed directly next to the two-inch (diameter) face of an EMI (9558) photo-multiplier tube which monitored the light output from the reaction. Liquid reagents were fed into the cell at rates from 0.1 to 0.5 ml/minute each. The optical cell tubing diameter was 0.187 in., I.D. The liquid-gas mixture was pulled by a Neptune-Dyna pump into a separation chamber, which in these tests was a separatory flask. The gases were then exhausted from the pump into the room atmosphere.

For tests with pure gas components, air was passed through charcoal filters before use. The main supply passed through an MSA CBR 86475 filter assembly before diluting the pollutant test sample. A CMA Canister Air Purifier, Serial C (Barneby-Cheney Corporation), was used on the air source to the sample gas supply.

Tests of atmospheric air were conducted by pulling air directly from the room into the reactor cells.

Teflon tubing was used throughout.

Manifestly minor changes in details of construction can be effected in the embodiment shown and described without departing from the spirit and scope of the invention and defined in and limited solely by the appended claims.

We claim:

1. A luminol-chemiluminescence type reaction air pollutants monitoring apparatus comprising:
   A. a composite reaction cell assembly;
   B. a plurality of separate microreactor test cells in said composite assembly;
   C. means for simultaneously introducing specimen samples of an ambient air mass into each said cell;
   D. means for introducing aqueous solutions of chemical compounds which produce chemiluminescence light evolution during reaction with the pollutants into the air stream to each said cell;
   E. selective adsorption means interposed in the air streams to each said cell to separate different respective gaseous components to be measured;
   F. a single photo-multiplier tube positioned proximate all said cells; and
   G. monotoring means mounted intermediate said cell assembly and said photo-multiplier tube operable to sequentially discretely expose each said cell to said photo-multiplier tube for discrete reception by said photo-multiplier tube of emitted produced light from each said cell.

2. Apparatus as in claim 1, said test cells consisting of light transmitting material for passage therethrough of produced light to said photo-multiplier tube.

3. Apparatus as in claim 2, said reaction cell assembly including a housing body, said test cells comprising U-shaped tubes spacedly mounted in said housing, a leg of each tube being connected to the ambient air introducing means and to the aqueous solutions introducing means.

4. Apparatus as in claim 3, said test cells being five in number and spacedly arranged in said housing, said selective adsorption means comprising columns equal in number to said cells and respectively containing ascarite-ferrous sulfate-chromic oxide, ferrous sulfate-chromic oxide, chromic oxide, ferrous sulfate and charcoal respectively operable to produce gaseous outputs of nitrogen dioxide, nitric oxide and nitrogen dioxide, ozone, sulfur dioxide, and filtered air for background samples.

5. Apparatus as in claim 4, including a multi segment neutral density filter interposed between said cell assembly and said photo-multiplier tube, the filter segments being operable to extend the sensitivity range of a photo-multiplier sensor detecting emitted light from said cells.

6. Apparatus as in claim 5, said means to sequentially expose each said cell comprising a rotary shutter having an aperture, said rotary shutter being rotatably mounted, drive means for said rotary shutter, and means for sequential phasing operational movement of the shutter for activating sequentially said test cells for light transmission to said photo-multiplier tube.

7. Apparatus as in claim 6, and including a five toothed ratchet wheel and a release index pawl for controlled movement of said ratchet wheel, said ratchet wheel being connected to said shutter and operable for sequential rotational movement thereof to position said aperture at a said test cell in open communication with said photo-multiplier tube.

8. Apparatus as in claim 7 and including means for sequentially operatively engaging said ratchet wheel and said shutter permitting rotation of said shutter.

9. Apparatus as in claim 3 and including an exhaust liquid-gas separator from said cells connected to the other of the legs of said U-shaped tubes and a single vacuum pump for transporting liquid and air through the exhaust, sampled air passing through said vacuum pump and liquid being separated therefrom.

10. Apparatus as in claim 4 and test signal readout means for receiving and correlating signals from said photo-multiplier tube for each said cell discretely for quantitative analysis of specific pollutants contained in air samples introduced into said test cells.

11. A luminol-chemiluminescence type reaction air pollutants monitoring apparatus comprising:
    A. a composite reaction cell assembly;
    B. five discrete test cells spacedly arranged in said assembly;
    C. said test cells consisting of U-shaped tubes of light transmitting material;
    D. means for simultaneously introducing samples of ambient air into a leg of each cell tube;
    E. means for introducing aqueous solutions of chemical compounds which produce chemiluminescence light evolution during reaction with pollutants into the leg of the tube of each said cell having the air stream introduced therein;
    F. selective adsorption means interposed in the air streams to each said cell to separate gaseous components to be measured, and including:
       i. columns equal in number to said cells and respectively containing ascarite-ferrous sulfate-chromic oxide, ferrous-sulfate-chromic oxide, chromic oxide, ferrous sulfate and charcoal respectively operable to produce gaseous outputs of nitrogen dioxide, nitric oxide and nitrogen dioxide, ozone, sulfur dioxide, and filtered air for background samples;
    G. a photo-multiplier tube positioned proximate all said cells; and
    H. means mounted intermediate said cell assembly and said photo-multiplier tube operable to sequentially discretely expose each said cell to said photo-multiplier tube for discrete reception of emitted produced light from each said cell.

12. Apparatus as in claim 11, including a multi segment neutral density filter interposed between said cell assembly and said photo-multiplier tube, the filter segments being operable to extend the sensitivity range of a photo-multiplier sensor detecting emitted light from said cells.

13. Apparatus as in claim 12, said means to sequentially expose each said cell comprising a rotary shutter having an aperture, said rotary shutter being rotatably mounted, drive means for said rotary shutter, and means for sequential phasing operational movement of the shutter for activating sequentially said test cells for light transmission to said photo-multiplier tube.

14. Apparatus as in claim 13, and including a five toothed ratchet wheel and a release index pawl for controlled movement of said ratchet wheel, said ratchet wheel being connected to said shutter and operable for sequential rotational movement thereof to position said aperture at a said test cell in open communication with said photo-multiplier tube.

15. Apparatus as in claim 14, and including means for sequentially operatively engaging said ratchet wheel and said shutter permitting rotation of said shutter.

16. Apparatus as in claim 11 and including an exhaust liquid-gas separator from said cells connected to the other of the legs of said U-shaped tubes and a single vacuum pump for transporting liquid and air through the exhaust, sampled air passing through said vacuum pump and liquid being separated therefrom.

17. Apparatus as in claim 11 and test signal readout means for receiving and correlating signals from said photo-multiplier tube for each said cell discretely for quantitative analysis of specific pollutants contained in air samples introduced into said test cells.

* * * * *